Dec. 12, 1939.  W. H. DROST ET AL  2,182,981
LIQUID SEAL FOR SHAFTS
Filed Nov. 21, 1938
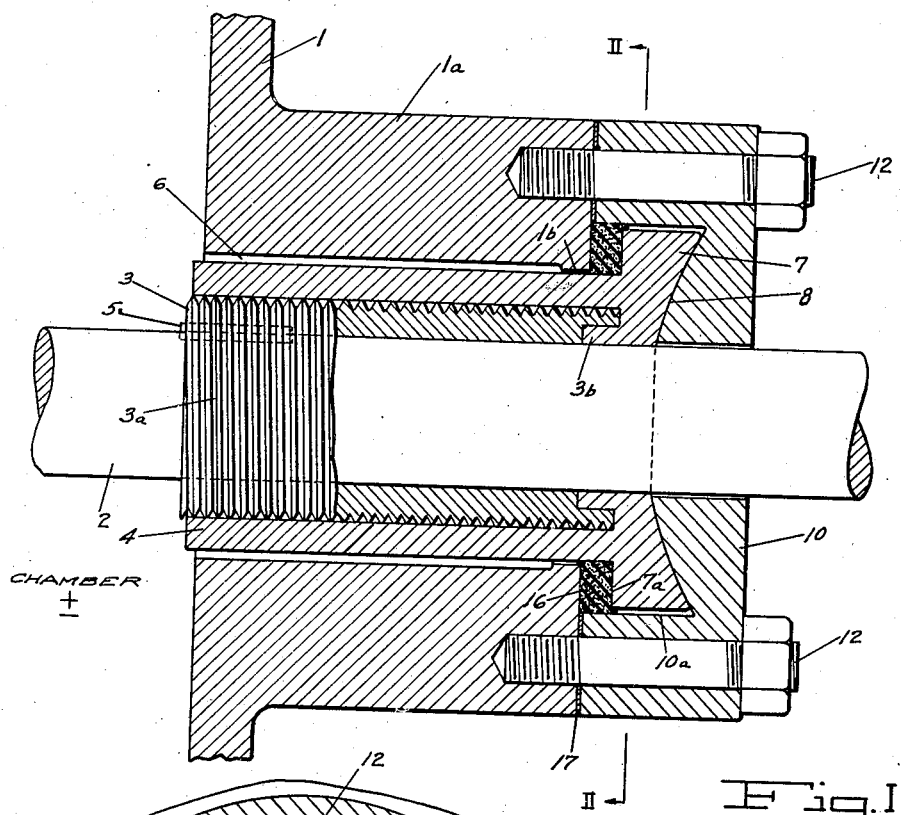
Fig. I
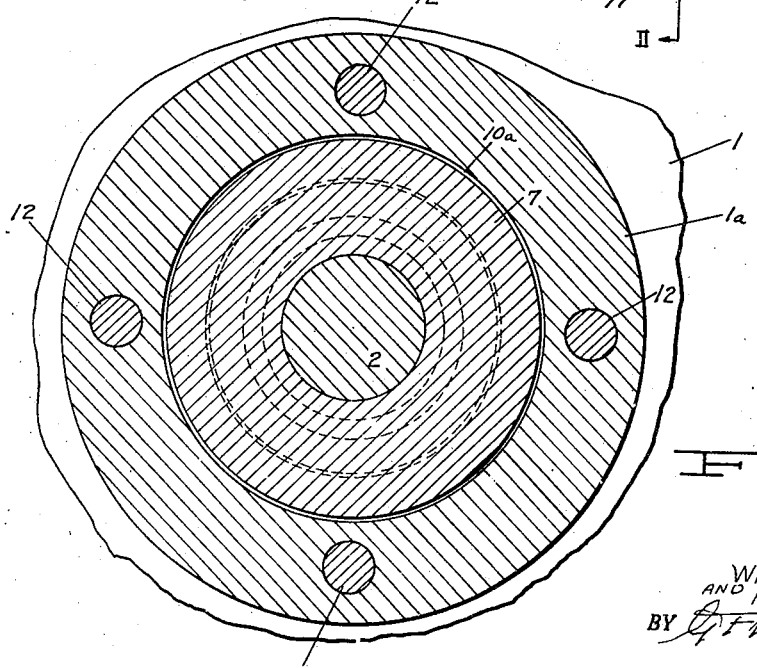
Fig. II
INVENTORS
WILLIAM H. DROST
AND ROY W. DROST
BY
ATTORNEY Patented Dec. 12, 1939

2,182,981

UNITED STATES PATENT OFFICE 2,182,981

LIQUID SEAL FOR SHAFTS

William H. Drost and Roy W. Drost, Portland, Oreg.

Application November 21, 1938, Serial No. 241,484

5 Claims. (Cl. 286—5)

This invention is a novel mounting for a liquid seal packing for a shaft, such as the shaft of a centrifugal pump, employing a sleeve-like cylinder in which the shaft runs with a threaded member running with a close fit in the cylinder and acting as a multi-stage screw pump that forces water back against the point where air would enter under the influence of vacuum, with sufficient force to overcome the vacuum effect.

In principle this type of shaft seal is known, but has had a very limited application because of two weaknesses that it is the object of this invention to overcome.

A. The impeller of a centrifugal pump can never be in dynamic balance until it has been found possible to make all of the water passages exactly alike so that the shaft is not deflected, a problem that is so far unsolved, hence a screw seal held in a rigidly supported sleeve will rapidly pound out.

B. While the screw in the type of liquid seal maintains a pressure very little actual liquid travels along the threads but even with that little there is danger from grit carried by the water getting into the close clearances and causing the parts to seize with their consequent ruination, requiring loss of time and renewing of quite expensive parts.

We overcome the first of these weaknesses by providing the cylinder with a floating bearing, utilizing the same principle that has been found so useful in mounting automobile engines with some variation as will be pointed out, but putting the bearing at the outside end of the cylinder where the motion is smallest and the inside end free to accommodate itself to shaft deflection, hence little frictional contact and no impact between the thread and the inside wall of the cylinder occurs, and it does not readily lose the close fit that is an absolute requirement of this type of seal.

We overcome the weakness referred to in paragraph B by so mounting the cylinder with a rubber mounting that if seizure does occur, the rubber yields and the cylinder becomes free to revolve with the screw, the latter being saved. Leakage will be at once apparent and in case of a centrifugal pump with a suction chamber at the inner end of the seal the pump will immediately lose its prime. Cleaning out the seal and replacement of the inexpensive rubber will then restore the seal, at a small expense of time and parts.

Such overhauling may be expected to occur much less often than repacking the well known stuffing box and with less expense.

We accomplish the objects stated and those that will be apparent by the structure illustrated in the accompanying drawing and described in the specification, it being borne in mind that the preferred form shown is by way of disclosure and not intended as a limitation. Various other forms that fall within the scope of the attached claims will serve the purpose more or less perfectly.

In the drawing—

Fig. I is a sectional view showing, in this case, a portion of a centrifugal pump casing with our water sealed shaft passing from inside to outside. A pump impeller will be rigidly attached to the left hand end of the shaft and a suitable shaft bearing will support the right hand end;

Fig. II is a section taken on the line II—II of Fig. I.

By way of detailed description. The word "chamber" at the left of Fig. I indicates a pump chamber and the plus minus signs indicate that it may be a plenum chamber or vacuum chamber, as the duty of the pump requires. It is here shown as a vacuum chamber with appropriately formed parts as hereinafter explained.

1 is the wall of the pump casing upon which is formed the boss 1a, provided with a bore 1b in substantial alignment with the indicated position of the shaft 2, which will have a direction of rotation, clockwise, as viewed from the right hand end.

Made rigid with the shaft 2 is a sleeve 3 that is threaded with a relatively fine thread 3a, preferably as shown on its entire cylindrical external surface. It is shown held rigid with the shaft 2 by the key 5 and will be white-leaded on the shaft or other precautions taken to make the mounting airtight.

We prefer to use the well known labyrinth end as shown at 3b, though this is merely an added precaution.

A cylinder 4 is made a close running fit for the threaded portion 3a of the sleeve 3, and the threads run substantially in contact with the bore of the cylinder 4, being slightly flattened at the apexes of the thread.

The cylinder 4 is loosely fitted in the bore 1b and depends on the shaft for centering, the space 6 varying in width from end to end according to function. Near the floating bearing where movement is very slight, it is narrow to form a support for the rubber cushion ring hereinafter described. The space 6 should provide for a maximum movement of about five thousandths of an inch at the free end in a well designed pump.

What really happens is this. There are a plurality of vanes, the issuing jets from which react against the pump shaft proportionately to the amount of power consumed, which being unequal there is always a resultant deflecting of the shaft. The force is too great to be resisted by the bearing surfaces available; hence we arrange the cylinder to follow the shaft with a minimum load and depend on the stiffness of the shaft to limit the deflection to a practicable amount.

The outside end of the cylinder 4 will have a head portion 7, preferably concaved as shown at 8. Inside it will be provided with complementary surfaces to complete the labyrinth 3b.

A flange plate 10 is bolted to the wall of the pump, serving to hold the head 7 frictionally with a complementary curved surface as shown, the head being held thereagainst by the rubber cushion ring 16 which is given suitable compression to load these surfaces when it is installed. The space 1b is made narrower than the space 6 since the movement at this point is minute and it is not desirable that the rubber be forced into it to any considerable depth.

The counterbore 10a is a little larger than the head 7 to permit motion of the cylinder 4 so that it may readily follow the shaft 2 when the pump is operating and the actual centerline of the shaft at the impeller is running around a small diameter circle.

The movement of the cylinder 4, as indicated, will ordinarily be less than five thousandths of an inch in a well designed pump; but this amount of motion must be accommodated or it will make room for itself. The unlubricated contact surface of the threads with the inside of the cylinder 4 will not support the load and the threads rapidly wear, especially under a high pumping head, destroying the effectiveness of a liquid seal, in a short time, if the cylinder is rigidly supported.

The inside surface of the head 7, a flange 7a, is supported by the soft rubber ring 16 which is so proportioned that it will be given a slight in-initial compression when the flange plate 10 is drawn down on its relatively hard gasket 17; thus the two curved surfaces offer sufficient resistance to turning.

It will be noted that a very small amount of lateral movement is provided for but it will also be noted that the movement required is somewhat less than half that at the free end of the cylinder 4, hence the amount of movement provided for is ample and that small amount absolutely necessary.

If seizure occurs between the threaded sleeve 3 and the cylinder 4, the rubber ring 16 acts as a safety valve operates for a boiler, by providing a weakest point to yield where it will do little damage.

If the chamber is a plenum chamber, the threads will have opposite pitch, tending to throw fluid back into the chamber.

Since a centrifugal pump cannot be started without a solid prime, water is always present in the chamber of a pump having a suction lift. The pressure starts to build up by reason of the threads forcing it towards the air and will always produce enough pumping head to resist atmosphere pressure, the labyrinth preventing external delivery of more than a few drops per minute.

Having illustrated and described the best way that we at present know of applying our invention, what we claim as new and wish to secure by Letters Patent, is—

1. A liquid seal for a shaft that passes through a wall, comprising a shaft, a threaded enlargement on said shaft that projects substantially inside of the wall, a cylinder mounted with a running fit on the threaded portion of the shaft to substantially cover the same, a spherical sector bearing at the outer end of the cylinder and a rubber cushion member effective to support said outer end of said cylinder floatingly air tight against a registering opening in the wall.

2. In a liquid shaft seal, a shaft, an enlarged threaded cylindrical portion on the shaft, a cylinder member that is mounted with a running fit on the threaded portion, a spherical sector head formed on one end of the cylinder, a concaved seat therefor and means including a resilient rubber seal for floatingly supporting the headed end of the cylinder while the opposite end is supported only by the shaft.

3. The combination according to claim 2 and including a labyrinth seal that is in part on the enlarged threaded portion of the shaft and in remainder on the inside of the headed end of the cylinder.

4. Liquid shaft sealing means for a shaft passing through a wall, comprising a wall provided with a shaft opening, a cylinder, one end of which is floatingly sealed in said opening but frictionally held against revolution, a spherical sector bearing therefor and a threaded shaft that passes through said cylinder with a running fit therein, characterized by the cylinder being supported entirely by the shaft that passes through it at the end opposite the wall opening.

5. A liquid shaft seal of the screw thread and cylinder type comprising a shaft, a wall through which the shaft passes, a threaded portion of said shaft adjacent said wall, a cylinder mounted on the shaft over the thread, means including a spherical sector bearing for floatingly sealing one end of the cylinder in the wall, and means for frictionally holding the cylinder against revolution, while the other end of said cylinder is supported solely by the threaded portion of the shaft upon which it is mounted.

WILLIAM H. DROST.
ROY W. DROST.